(12) United States Patent
Hamad et al.

(10) Patent No.: US 10,760,507 B2
(45) Date of Patent: Sep. 1, 2020

(54) SOLVENT-BASED ADSORBENT REGENERATION FOR ONBOARD OCTANE ON-DEMAND AND CETANE ON-DEMAND

(71) Applicant: Saudi Arabian Oil Company, Dhahran (SA)

(72) Inventors: Esam Zaki Hamad, Dhahran (SA); Eman AbdelHakim A. M. Tora, Faisal (EG); Amer A. Amer, Dhahran (SA); Junseok Chang, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/520,748

(22) Filed: Jul. 24, 2019

(65) Prior Publication Data
US 2019/0368451 A1 Dec. 5, 2019

Related U.S. Application Data (63) Continuation of application No. 15/939,971, filed on Mar. 29, 2018, now Pat. No. 10,408,139.

(51) Int. Cl.
*F02M 25/00* (2006.01)
*F02D 19/06* (2006.01)
(Continued)

(52) U.S. Cl.
CPC ......... *F02D 19/0671* (2013.01); *B01D 15/34* (2013.01); *B01D 15/3804* (2013.01);
(Continued)

(58) Field of Classification Search
CPC ............ B01D 53/02; B01D 2259/4516; B01D 2256/24; F02M 31/18; F02M 37/22; C10L 2290/542; C10L 2270/023
See application file for complete search history.

(56) References Cited

U.S. PATENT DOCUMENTS 3,985,108 A   10/1976 Matsumoto et al.
4,212,276 A   7/1980 Kaneda
(Continued)

FOREIGN PATENT DOCUMENTS

CN   102399602 A   4/2012
CN   202226834 U   5/2012
(Continued)

OTHER PUBLICATIONS

Setty, Varadaraja, B.E., "The Effect of Oxygen-Enriched Air on the Performance and Exhaust Emissions of Internal Combution Engines", A Thesis submitted to the Graduate Faculty of Texas Tech University; May 1993.
(Continued)

*Primary Examiner* — Long T Tran
(74) *Attorney, Agent, or Firm* — Dinsmore & Shohl LLP (57) ABSTRACT

A vehicular propulsion system, a vehicular fuel system and a method of producing fuel for an internal combustion engine. A separation unit that makes up a part of the fuel system includes one or more adsorbent-based reaction chambers to selectively receive and separate at least a portion of onboard fuel into octane-enhanced and cetane-enhanced components. Regeneration of an adsorbate takes place through interaction with a solvent, while subsequent separation allows the solvent to be reused. A controller may be used to determine a particular operational condition of the internal combustion engine such that the onboard fuel can be sent to one or more combustion chambers within the internal combustion engine without first passing through the separation unit, or instead to the separation unit in situations where the internal combustion engine may require an octane-rich or cetane-rich mixture.

14 Claims, 3 Drawing Sheets

(51) Int. Cl.

| | | |
|---|---|---|
| *F02M 37/00* | (2006.01) | |
| *F02M 27/00* | (2006.01) | |
| *B01D 15/34* | (2006.01) | |
| *B01D 15/38* | (2006.01) | |
| *B01D 15/42* | (2006.01) | |
| *C10L 1/06* | (2006.01) | |
| *C10L 1/08* | (2006.01) | |
| *F02D 41/00* | (2006.01) | |
| *F02M 37/22* | (2019.01) | |
| *C10G 25/00* | (2006.01) | |
| *C10G 21/16* | (2006.01) | |
| *C10G 25/03* | (2006.01) | |
| *C10G 21/28* | (2006.01) | |

(52) U.S. Cl.
CPC .............. *B01D 15/424* (2013.01); *C10L 1/06* (2013.01); *C10L 1/08* (2013.01); *F02D 19/0649* (2013.01); *F02D 19/0697* (2013.01); *F02D 41/0025* (2013.01); *F02M 27/00* (2013.01); *F02M 37/0064* (2013.01); *F02M 37/22* (2013.01); *C10G 21/16* (2013.01); *C10G 21/28* (2013.01); *C10G 25/003* (2013.01); *C10G 25/03* (2013.01); *C10L 2200/0423* (2013.01); *C10L 2200/0446* (2013.01); *C10L 2270/023* (2013.01); *C10L 2270/026* (2013.01); *C10L 2290/542* (2013.01); *C10L 2290/58* (2013.01); *F02D 2200/021* (2013.01)

(56) References Cited

U.S. PATENT DOCUMENTS

| | | |
|---|---|---|
| 4,308,841 A | 1/1982 | Kingsley |
| 4,963,745 A | 10/1990 | Maggard |
| 5,018,645 A | 5/1991 | Zinsmeyer |
| 5,132,486 A | 7/1992 | Wylie |
| 5,357,908 A | 10/1994 | Sung et al. |
| 5,649,517 A | 7/1997 | Poola et al. |
| 5,794,601 A | 8/1998 | Pantone |
| 5,921,263 A | 7/1999 | Negley, III |
| 5,979,705 A | 11/1999 | Kaehler et al. |
| 6,055,808 A | 5/2000 | Poola et al. |
| 6,067,973 A | 5/2000 | Chanda et al. |
| 6,112,134 A | 8/2000 | Terranova et al. |
| 6,119,637 A | 9/2000 | Matthews et al. |
| 6,161,060 A | 12/2000 | Collins |
| 6,163,738 A | 12/2000 | Miller |
| 6,173,567 B1 | 1/2001 | Poola et al. |
| 6,230,693 B1 | 5/2001 | Meiller et al. |
| 6,332,448 B1 | 12/2001 | Ilyama et al. |
| 6,352,068 B1 | 3/2002 | Jacobsen |
| 6,380,859 B1 | 4/2002 | Brownlee |
| 6,422,465 B2 | 7/2002 | Miller |
| 6,494,192 B1 | 12/2002 | Capshaw et al. |
| 6,505,134 B2 | 1/2003 | Poleshuk et al. |
| 6,543,687 B2 | 4/2003 | Negley et al. |
| 6,742,507 B2 | 6/2004 | Keefer et al. |
| 6,972,093 B2 | 12/2005 | Partridge et al. |
| 7,032,629 B1 | 4/2006 | Mattingly et al. |
| 7,100,543 B2 | 9/2006 | Davidson |
| 7,370,610 B2 | 5/2008 | Ashford et al. |
| 7,377,272 B2 | 5/2008 | Davidson |
| 7,455,046 B2 | 11/2008 | Biruduganti et al. |
| 7,459,592 B2 | 12/2008 | Wolf et al. |
| 7,523,770 B2 | 4/2009 | Horowitz et al. |
| 7,900,607 B2 | 3/2011 | Lang et al. |
| 7,954,478 B1 | 6/2011 | Schechter |
| 7,958,872 B1 | 6/2011 | Schechter |
| 8,046,984 B1 | 11/2011 | Schechter |
| 8,051,828 B2 | 11/2011 | Sengupta et al. |
| 8,118,009 B2 | 2/2012 | Pursifull et al. |
| 8,141,356 B2 | 3/2012 | Leone et al. |
| 8,211,300 B2 | 7/2012 | Partridge et al. |
| 8,258,363 B2 | 9/2012 | Kalakkunnath et al. |
| 8,375,899 B2 | 2/2013 | Leone et al. |
| 8,459,238 B2 | 6/2013 | Pursifull et al. |
| 8,506,656 B1 | 8/2013 | Turocy |
| 8,580,111 B2 | 11/2013 | Partridge et al. |
| 8,656,869 B2 | 2/2014 | Leone et al. |
| 8,991,358 B2 | 3/2015 | Gehrke |
| 9,422,147 B2 | 8/2016 | Bartlett et al. |
| 9,776,624 B1 | 10/2017 | Leone et al. |
| 9,802,810 B2 | 10/2017 | Johnson et al. |
| 10,260,015 B2 | 4/2019 | Gosling et al. |
| 2001/0011539 A1 | 8/2001 | Ito et al. |
| 2002/0025459 A1 | 2/2002 | Agar et al. |
| 2002/0152999 A1 | 10/2002 | Holder et al. |
| 2005/0055874 A1 | 3/2005 | Bekemeyer |
| 2005/0066576 A1 | 3/2005 | Morris et al. |
| 2005/0222748 A1 | 10/2005 | Naik et al. |
| 2006/0009670 A1 | 1/2006 | Briot et al. |
| 2006/0037589 A1 | 2/2006 | Gupta et al. |
| 2007/0107676 A1 | 5/2007 | Davidson |
| 2007/0256665 A1 | 11/2007 | Sun et al. |
| 2008/0041226 A1* | 2/2008 | Hiltzik ............... F02M 25/0854 95/90 |
| 2008/0196695 A1 | 8/2008 | Storhok et al. |
| 2008/0202118 A1 | 8/2008 | Ide et al. |
| 2008/0308073 A1 | 12/2008 | Allen et al. |
| 2008/0308074 A1 | 12/2008 | Allen et al. |
| 2008/0308075 A1 | 12/2008 | Allen et al. |
| 2009/0165759 A1 | 7/2009 | Sengupta et al. |
| 2009/0255875 A1 | 10/2009 | Unger et al. |
| 2010/0107877 A1* | 5/2010 | Suzuki ................... B01D 63/02 96/6 |
| 2011/0011264 A1 | 1/2011 | Makino et al. |
| 2011/0023841 A1 | 2/2011 | Ucke et al. |
| 2011/0146491 A1* | 6/2011 | Suefuji ............... B01D 63/046 96/8 |
| 2012/0006504 A1 | 1/2012 | Sugiura |
| 2012/0031812 A1 | 2/2012 | Paggi |
| 2012/0192834 A1 | 8/2012 | Tonery |
| 2013/0014731 A1 | 1/2013 | Pursifull et al. |
| 2013/0061934 A1 | 3/2013 | Kambakhsh et al. |
| 2013/0168311 A1 | 7/2013 | Johnson et al. |
| 2013/0213349 A1 | 8/2013 | Sellnau et al. |
| 2013/0255493 A1 | 10/2013 | Gupta |
| 2013/0269521 A1 | 10/2013 | Nishita et al. |
| 2013/0289850 A1 | 10/2013 | Johnson et al. |
| 2014/0150485 A1 | 6/2014 | Weickert et al. |
| 2015/0114362 A1 | 4/2015 | Costa-Patry et al. |
| 2015/0353853 A1 | 12/2015 | Iwashita et al. |
| 2016/0076492 A1 | 3/2016 | Leone et al. |
| 2016/0265493 A1 | 9/2016 | Bima |
| 2016/0313171 A1 | 10/2016 | Dudar et al. |
| 2016/0368373 A1 | 12/2016 | Dudar et al. |
| 2017/0107162 A1* | 4/2017 | Duggal ............... B01D 53/229 |
| 2017/0122668 A1 | 5/2017 | Fujii et al. |
| 2017/0167447 A1 | 6/2017 | Omichi et al. |
| 2017/0211532 A1 | 7/2017 | Yamauchi et al. |
| 2017/0234276 A1 | 8/2017 | Hamad et al. |
| 2018/0163141 A1* | 6/2018 | Boon ....................... C10G 3/52 |
| 2018/0230072 A1 | 8/2018 | Eddaoudi et al. |

FOREIGN PATENT DOCUMENTS

| | | |
|---|---|---|
| CN | 103045285 A | 4/2013 |
| DE | 102004049218 A1 | 4/2006 |
| EP | 1057988 A2 | 12/2000 |
| JP | 2004231296 A | 8/2004 |
| JP | 2004277016 A | 10/2004 |
| JP | 2010163901 A | 7/2010 |
| WO | 2011007121 A2 | 1/2011 |
| WO | 2017014976 A1 | 1/2017 |

OTHER PUBLICATIONS

"Different Strokes Infiniti Articulates Its Case for Variable Compression" "www.roadandtrack.comPublished: Feb. 2017".

(56) References Cited

OTHER PUBLICATIONS

International Search Report pertaining to Application No. PCT/US2018/023962 dated Aug. 6, 2018.
"International Search Report and Written Opinion pertaining to International Application PCT/US2018/054182, Dec. 19, 2018, 14 pages".
U.S. Office Action pertaining to U.S. Appl. No. 15/885,084 dated Jan. 2, 2019, 20 pages.
Notice of Allowance dated Apr. 11, 2019 pertaining to U.S. Appl. No. 15/885,084, filed Jan. 31, 2018, 13 pgs.
Notice of Allowance dated May 1, 2019 pertaining to U.S. Appl. No. 15/939,971 filed Mar. 29, 2018, 32 pgs.
Notice of Allowance dated May 13, 2019 pertaining to U.S. Appl. No. 15/939,930, filed Mar. 29, 2018, 32 pgs.
Notice of Allowance dated Mar. 11, 2019 pertaining to U.S. Appl. No. 15/475,383, filed Mar. 31, 2017, 23 pgs.
Notice of Allowability dated May 13, 2019 pertaining to U.S. Appl. No. 15/475,383, filed Mar. 31, 2017, 7 pgs.
International Search Report and Written Opinion dated May 6, 2019 pertaining to International application No. PCT/US2019/015330 filed Jan. 28, 2019.
International Search Report and Written Opinion dated May 15, 2019 pertaining to International application No. PCT/US2019/015349 filed Jan. 28, 2019, 13 pgs.
International Search Report and Written Opinion dated Jun. 26, 2019 pertaining to International application No. PCT/US2019/021987 filed Mar. 13, 2019.
Notice of Allowance and Fee(s) Due dated Sep. 25, 2019 pertaining to U.S. Appl. No. 16/452,870, filed Jun. 26, 2019, 18 pgs.
Notice of Allowance and Fee(s) Due dated Jun. 9, 2020 pertaining to U.S. Appl. No. 16/551,047, filed Aug. 26, 2019, 31 pgs.

\* cited by examiner

SOLVENT-BASED ADSORBENT REGENERATION FOR ONBOARD OCTANE ON-DEMAND AND CETANE ON-DEMAND

CROSS-REFERENCE TO RELATED APPLICATION

This application is a continuation application of U.S. patent application Ser. No. 15/939,971 filed on Mar. 29, 2018, the entire disclosure of which is hereby incorporated herein by reference.

BACKGROUND

The present disclosure relates generally to a vehicular fuel system for selectively separating an onboard fuel into octane-rich and cetane-rich components, and more particularly to such a system that promotes adsorption and solvent-based desorption as part of such onboard fuel separation in such a way to reduce the size, weight and complexity associated with such fuel separation activities.

SUMMARY

Within the realm of internal combustion engines (ICEs) used for vehicular propulsion, it is the four-cycle variant (with its intake, compression, combustion and exhaust strokes) that is most commonly in use, where the combustion is typically achieved through either a spark ignition (SI) mode or compression ignition (CI) mode of operation. In SI-based modes, a mixture of air and fuel (typically octane-rich gasoline) is introduced into a combustion chamber for compression and subsequent ignition via spark plug. In CI-based modes, fuel (typically cetane-rich diesel fuel) is introduced into the combustion chamber where the air is already present in a highly compressed form such that the elevated temperature within the chamber that accompanies the increased pressure causes the fuel to auto-ignite. Of the two, the CI mode tends to operate with greater efficiency, while the SI mode tends to operate with lower emissions.

Various engine concepts or configurations may mimic the relatively low emissions of an SI mode of operation while simultaneously satisfying the high efficiency operation of a CI mode of operation. Such concepts go by various names, and include gasoline direct injection compression ignition (GDCI), homogenous charge compression ignition (HCCI), reactivity controlled compression ignition (RCCI), as well as others. In one form, a single fuel may be used, while in others, multiple fuels of differing reactivities, usually in the form of selective octane-enrichment or cetane-enrichment, may be introduced. While performing octane on demand (OOD) or cetane on demand (COD) as a way of fueling these engines is possible, such activities may be fraught with problems. For example, having the respective octane-enriched or cetane-enriched portions be in either pre-separated form involves the parallel use of at least two onboard storage tanks and associated delivery conduit. In addition, the time and complexity associated with vehicle refueling activity in this circumstance renders the possibility of operator error significant. Likewise, OOD or COD generation once the single market fuel is already onboard may require distillation or membrane-based permeation-evaporation (pervaporation) activities that are accompanied by significant increases in size, weight and overall complexity of the onboard fuel-reforming infrastructure. These difficulties are particularly acute as they relate to achieving a heat balance associated with the underlying fuel enrichment activities. As such, a simplified approach to integrating such infrastructure into an onboard fuel separation system is warranted.

According to one embodiment of the present disclosure, a vehicular propulsion system is disclosed. The propulsion system includes an ICE with one or more combustion chambers and a fuel system for converting an onboard fuel into octane-rich and cetane-rich fuel components. The fuel system includes an onboard source of fuel in the form of a fuel supply tank (also referred to herein as an onboard fuel tank, main tank, market fuel tank or the like), fuel conduit, a separation unit, a solvent supply, a solvent regeneration unit and a pair of enriched product tanks. The fuel conduit provides fluid connectivity between at least some of the fuel supply tank, separation unit and enriched product tanks. The separation unit includes one or more adsorbent-based reaction chambers that can selectively receive and separate at least a portion of the onboard fuel into an adsorbate and a remainder. The solvent supply works in conjunction with the separation unit such that one or more solvents contained within the solvent supply may be brought into contact with the adsorbate that forms in the reaction chambers such that the solvent acts to convert at least a portion of the adsorbate into a desorbate so that the desorbed compound may be removed. After the solvent removes the desorbate from the reaction chamber, the solvent-desorbate mixture is introduced to a solvent regeneration unit that can separate the solvent from the desorbate. In this way, the separated desorbate may then be routed either to a first of the enriched product tank for storage, or directly to the combustion chamber, depending on the need. A second of the enriched product tanks is fluidly coupled to the reaction chamber (or chambers) for receiving and containing the remainder of the onboard fuel that did not get adsorbed. During operation of the ICE, the fuel system is in fluid communication with the ICE such that one or more of the supply tank and the first and second enriched product tanks provide their respective onboard fuel, separated desorbate and remainder to the one or more combustion chambers.

According to another embodiment of the present disclosure, a vehicular fuel system for converting an onboard fuel into octane-rich and cetane-rich components is disclosed. The fuel system includes a supply tank for containing the onboard fuel, fuel conduit in fluid communication with the supply tank, a separation unit in fluid communication with the supply tank through the fuel conduit, a solvent supply in fluid communication with the separation unit and containing one or more solvents to convert at least a portion of the adsorbate into a desorbate, a solvent regeneration unit configured to separate at least a portion of the solvent from the desorbate, and a pair of enriched product tanks the first of which receives and contains the portion of the desorbate that has been separated from the one or more solvents, and a second of which receives and contains the non-adsorbed remainder from the onboard supply of fuel that was delivered to one or more adsorbent-based reaction chambers that make up the separation unit.

According to yet another embodiment of the present disclosure, a method of producing fuel that is used in an ICE to provide propulsive power to a vehicle is disclosed. The method includes conveying an onboard (that is to say, market) fuel to a separation unit, contacting the fuel with an adsorbent situated within the separation unit such that at least some of the fuel is converted into an adsorbate and at least some of the fuel is converted into a remainder, reacting one or more solvents with the adsorbate such that at least some of the adsorbate is converted into a desorbate, separating the desorbate from the solvent or solvents, and conveying one or more of the onboard fuel, separated desorbate and remainder to a combustion chamber within the ICE.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

In the present disclosure, a fuel system with adsorption-based separation may be used to first split an onboard fuel into OOD or COD streams and then to regenerate the adsorbent by solvent desorption of the adsorbate. Within the present context, the term "adsorbate" and its variants include those portions of the onboard fuel that interact by surface retention (rather than by bulk absorption) with the adsorbent, while the term "desorbate" and its variants include those portions of the adsorbate that are subsequently liberated from the adsorbent as a result of the solvent-based regenerating action. The adsorption can take advantage of one or both of two specific mechanisms: (1) employing differing functional groups that attract specific adsorbates (such as aromatics, cyclic and optional oxygenates) that are present in the onboard fuel supply in what is referred to in the present disclosure as an affinity-based adsorbent; and (2) using a molecular sieve to selectively pass certain smaller (that is to say, linear) molecules while retaining larger (that is to say, branched) ones in what is referred to in the present disclosure as a size selective-based adsorbent. Examples of the first type of adsorbent include activated carbon, silica, and alumina, as well as some types of zeolites and functionalized porous material in general, while examples of the second type include zeolites, metal organic frameworks and structured porous material. Accordingly, the type of sorbent material used for a particular adsorption reaction may be based on the way the sorbent functions where affinity-based sorbents are useful for generating octane-rich fuel components from the market fuel owing at least in part to the specific functionality (oxygen atom, aromatic, or double bond) attributes of such components. As such, affinity-based adsorbents use this functionality to preferentially capture octane-rich fuel components. It is noted that there are some high cetane number (CN) additives that have functional groups such that if present in the market fuel, the affinity-based sorbents could capture them as well; nevertheless, the presence of such materials is deemed to be low enough to not significantly impede the ability of affinity-based adsorbents to provide an adsorbate with a higher research octane number (RON) than that present in the market fuel. Likewise, size selective-based sorbents are preferred for generating cetane-rich fuel components because of the linear structure (and relatively small molecular footprint) of alkanes and other such components in commercial fuels. As such, size selective-based adsorbents take advantage of the relatively small aromatics with single benzene rings (such as benzene, toluene and xylene) that are prevalent in gasoline and the larger aromatics in the form of polycyclic (or polynuclear) aromatic hydrocarbons (PAHs) including naphthalene and its derivatives in diesel fuel to preferentially capture cetane-rich fuel components.

Figure 3:
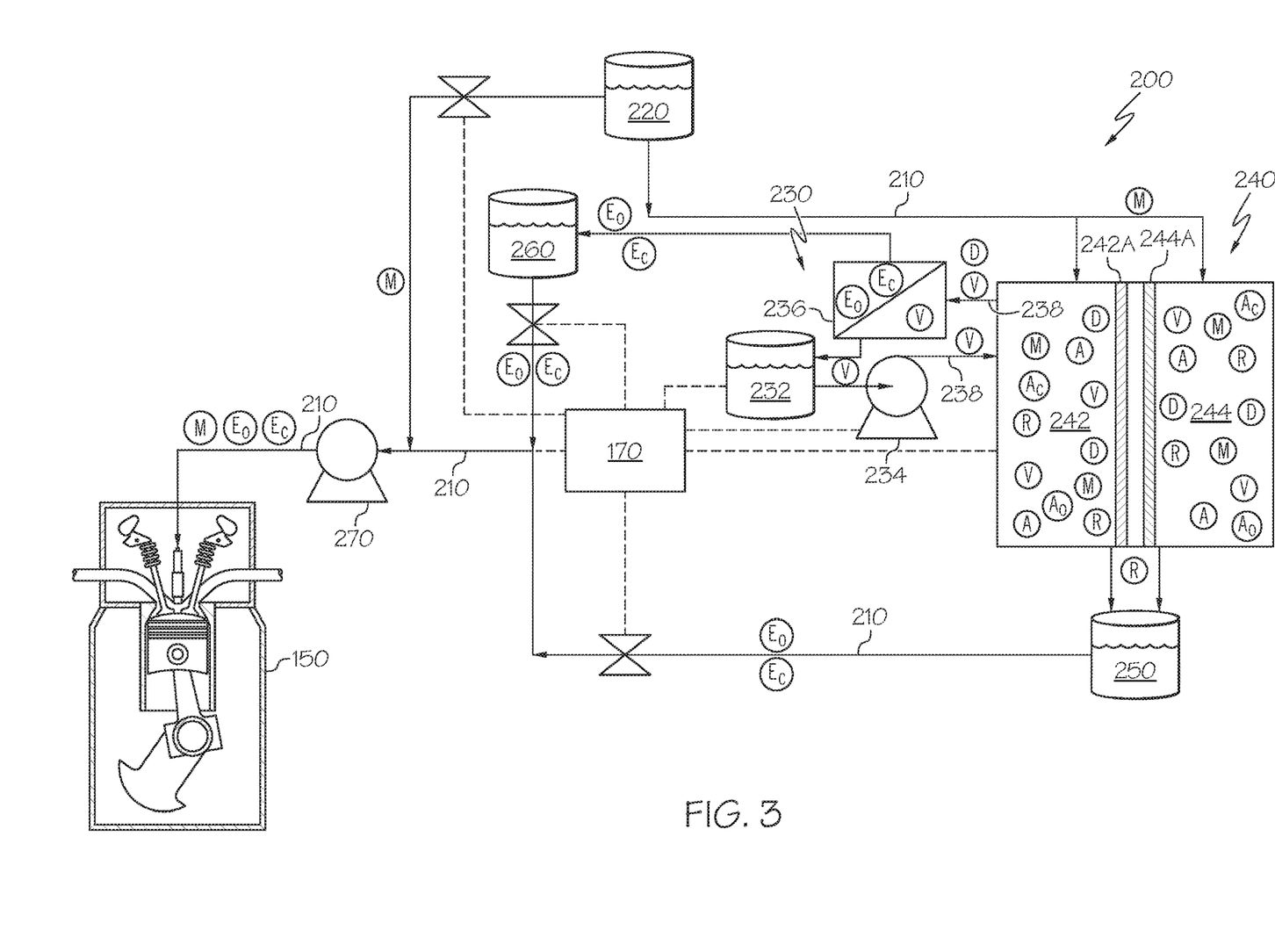
FIG. 3 illustrates a simplified view of an onboard fuel separation system in accordance with one or more embodiments shown or described.

Referring initially to FIG. 3, details associated with the use of solvent-based desorption for performing onboard COD and OOD operations while avoiding complicated component redundancy for fuel system 200 are shown. By taking advantage of existing onboard fuel delivery and ICE 150 operating infrastructure, any on-vehicle adsorbing and regenerating activities can be achieved without requiring additional heating or cooling equipment or efficiency-decreasing activities such as those associated with the high pressure operation of membrane-based pervaporation equipment. The fuel system 200 includes a network of pipes, tubing or related flow channels—along with various valves to preferentially permit or inhibit the flow of the onboard fuel and its byproducts of fuels, depending on the need—that make up conduit 210. The solvent supply 230 is coupled to the market fuel M being delivered from the tank 220 through conduit 210 so that if the market fuel M that is being delivered to either the combustion chamber 156 or separation unit 240 is in need of being enriched with either octane or cetane, it can receive such enrichment from the cooperation of the solvent supply 230 and the separation unit 240. In one form, the solvent supply 230 may include a solvent tank 232 for holding an eluent in the form of solvent V such as ethylene glycol, propylene carbonate or the like, while a pump 234 may be used to pressurize and deliver the solvent V contained in the solvent tank 232 to the reaction chambers 242, 244 of separation unit 240.

Within the present context, a remainder R (also referred to as a filtrate) is the portion of the market fuel M being exposed to the adsorbent 242A, 244A in the reaction chambers 242, 244 that does not get adsorbed, such as through one or both of the previously-discussed functional group or molecular sieve modes of adsorbent 242A, 244A operation Likewise, the adsorbate A (also referred to as an eluate) is the portion of the market fuel M being exposed to the adsorbent 242A, 244A in the reaction chambers 242, 244 that does get adsorbed, while the solvent V used to desorb the adsorbate A is referred to as the eluent. In addition, a fuel is deemed to be octane-rich when it has a concentration of octane ($C_8H_{18}$) or related anti-knocking agent that is greater than that of the commercially-available market fuel M from which one or more separation activities discussed herein have been employed. By way of example, a fuel would be considered to be octane-rich if it had a RON of greater than about 91-92 or an anti-knock index (AKI) of greater than about 85-87 for a so-called regular grade unleaded fuel, with respectively slightly higher values for mid-grade unleaded fuel and premium unleaded fuel. It will be understood that there are regional variations in the values of RON, AKI or other octane indicia, and that the ones expressly discussed in the previous sentence contemplate a United States market. Nevertheless, such values will be understood to be suitably adjusted to take into consideration these regional variations, and that all such values are deemed to be within the scope of the present disclosure within their respective region, country or related jurisdiction. As with octane, a fuel is deemed to be cetane-rich when it has a concentration of cetane ($C_{16}H_{34}$) that is greater than that of the commercially-available market fuel M. By way of example, a fuel would be considered to be cetane-rich if it had a CN of greater than about 40-45 as understood in the United States market, with suitable variations elsewhere.

Figure 1:
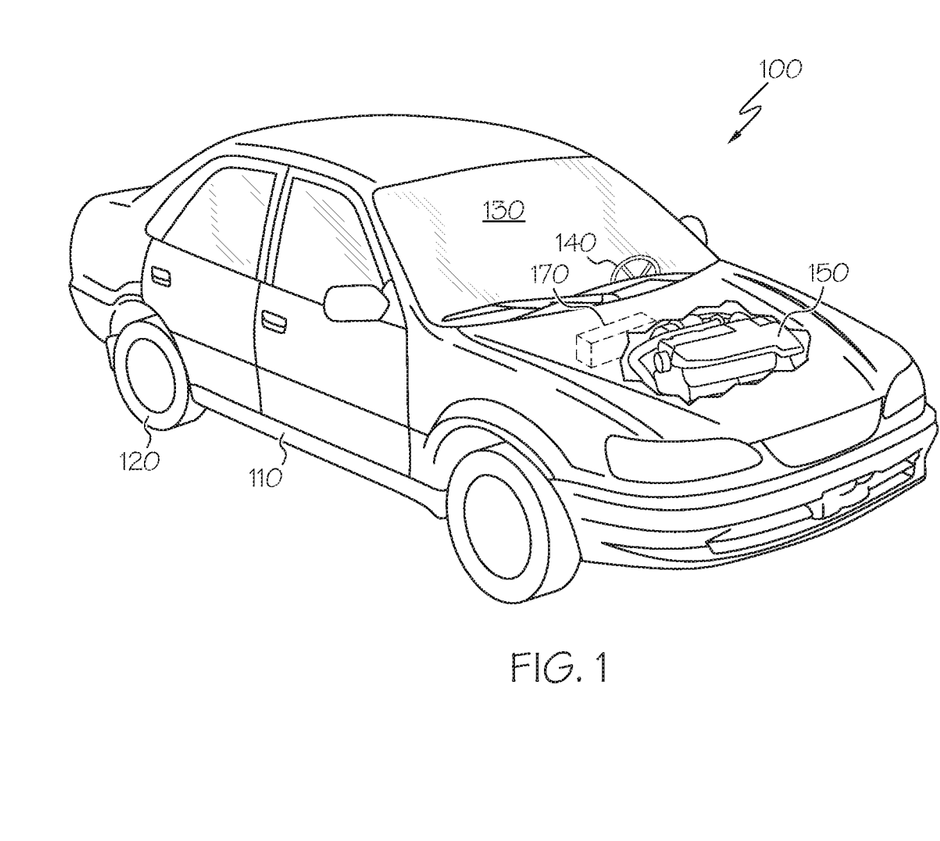
FIG. 1 shows a vehicle with a partial cutaway view of an engine in accordance with one or more embodiments shown or described.

Referring next to FIG. 1, a vehicle 100 includes a chassis 110 with a plurality of wheels 120. Chassis 110 may either be of body-on-frame or unibody construction, and both configurations are deemed to be within the scope of the present disclosure. The passenger compartment 130 is formed inside the chassis 110 and serves not only as a place to transport passengers and cargo, but also as a place from which a driver may operate vehicle 100. A guidance apparatus (which may include, among other things, steering wheel, accelerator, brakes or the like) 140 is used in cooperation with the chassis 110 and wheels 120 and other systems to control movement of the vehicle 100. An ICE 150 is situated within an engine compartment in or on the chassis 110 to provide propulsive power to the vehicle 100 while a controller 170 interacts with ICE 150 to provide instructions for the latter's operation.

Figure 2:
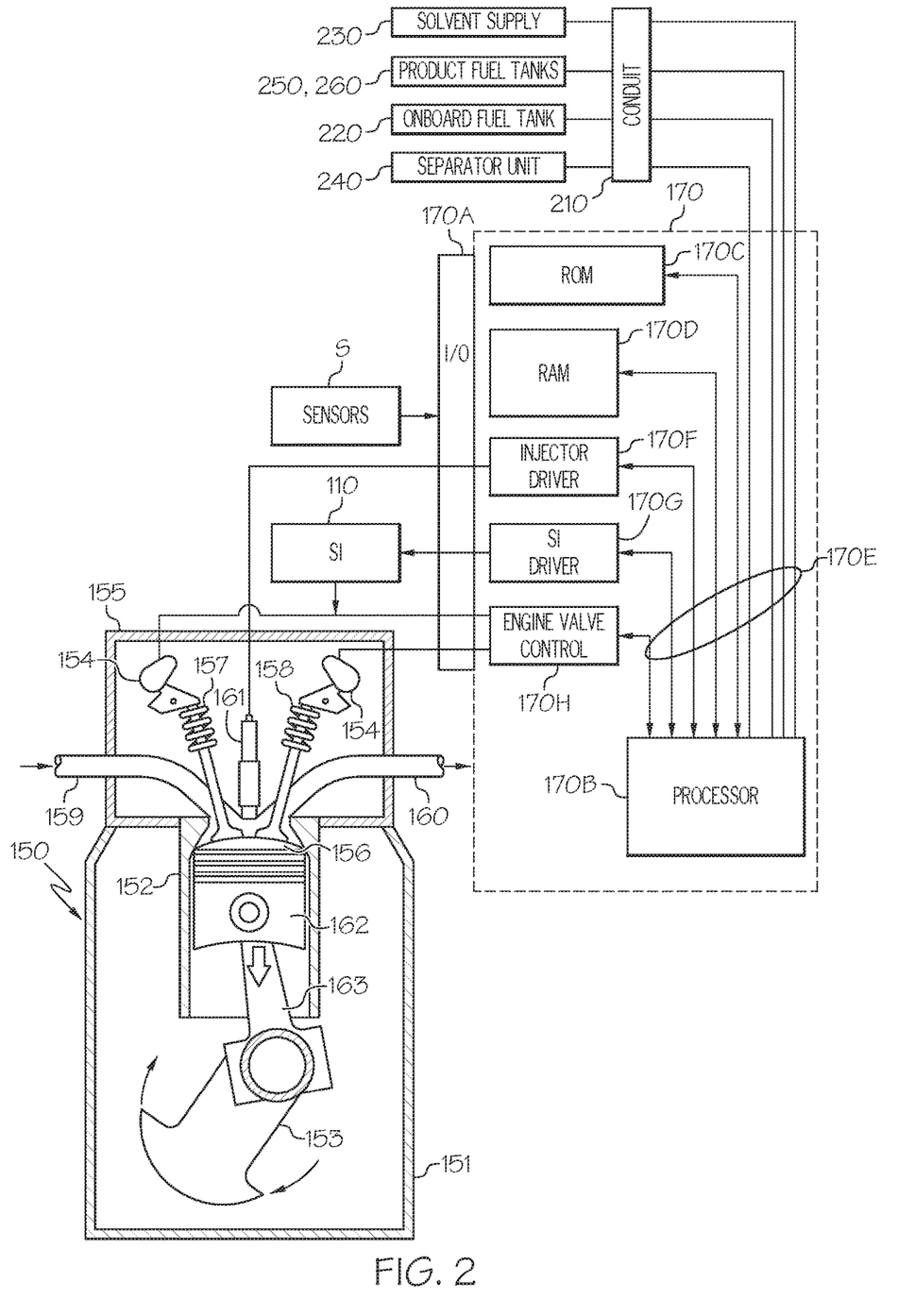
FIG. 2 shows a simplified cutaway view of a cylinder of the engine of FIG. 1 along with a controller in accordance with one or more embodiments shown or described.

Referring next to FIG. 2, details associated with the structure and operation of a portion of the ICE 150 and the controller 170 are shown. The ICE 150 includes an engine block 151 with numerous cylinders 152, a crankshaft 153 rotatably movable within the block 151, numerous cams 154 responsive to movement of the crankshaft 153, a head 155 coupled to the engine block 151 to define numerous combustion chambers 156. The head 155 includes inlet valves 157 and exhaust valves 158 (only one of each is shown) that in one form may be spring-biased to move in response to the crankshaft 153 through a corresponding one of the cams 154 that are controlled by either a crankshaft-driven chain, crankshaft-actuated pushrods or pneumatic actuators (none of which are shown). An air inlet 159 and an exhaust gas outlet 160 are in selective fluid communication with each of the combustion chambers 156 through a fuel injector 161, while a piston 162 is received in each respective cylinder 152 and coupled to the crankshaft 153 through a connecting rod 163 so that the reciprocating movement of the piston 162 in response to an SI or CI combustion taking place within the combustion chamber 156 is converted by the pivoting movement of the connecting rod 163 and crankshaft 153 to rotational movement of the crankshaft 153 for subsequent power delivery to the remainder of a powertrain that is made up of the ICE 150 and transmission, axles, differentials (none of which are shown) and wheels 120. Although ICE 150 is shown without a spark ignition device (such as a spark plug) in a manner consistent with the various CI-based engine configurations (such as RCCI, HCCI or the like), it will be understood that in certain operating loads or conditions such as low loads, cold starts and associated warm-ups, such a spark ignition may be used (possibly in conjunction with some throttling) to increase the flame propagation combustion rate while keeping lower cylinder pressures.

In one form, ICE 150 is configured as a gasoline compression ignition (GCI) engine that can be operated with a gasoline-based fuel. In such case, the presently-disclosed fuel system may be used to achieve COD through operation on various fuels, including market gasoline, gasoline without an oxygenate or related anti-knock compound (also referred to as base gasoline) or gasoline with one of the many types of alkyls, aromatics or alcohols. In one non-limiting example, such fuel may have a boiling temperature in the range of ambient to about 200° C. Unlike an SI mode of operation where the fuel is substantially injected during the four-cycle operation's inlet stroke, a GCI mode substantially injects the fuel during the compression stroke. In one form, the fuel and air are not fully mixed, which permits phasing of the combustion process to be controlled by the injection process. Moreover, the ignition delay permitted by gasoline-based fuels versus diesel-based fuels will allow for the partially premixed fuel and air to become more mixed during compression, which in turn will leave to improvements in combustion. A gasoline-based market fuel M with some amount of fuel and air premixing helps ensure suitable fuel-air equivalence ratios for various engine loads and associated fuel injection timing scenarios. Thus, when configured as a GCI engine, ICE 150 using a fuel in the gasoline autoignition range (where for example, the RON is greater than about 60 and the CN is less than about 30) can provide relatively long ignition delay times compared to conventional diesel fuels. This in turn can lead to improved fuel-air mixing and related engine efficiency, along with lower soot and NOx formation; this latter improvement leads in turn to a simplified exhaust gas treatment system since the emphasis is now on oxidizing hydrocarbons and carbon monoxide in an oxygen-rich environment rather than trying to simultaneously control NOx and soot. Moreover, when operated as a GCI engine, ICE 150 requires lower fuel injection pressures than diesel-based CI engines.

Furthermore, when configured as a GCI engine, ICE 150 may take advantage of the market fuel M that is in gasoline form, especially when such fuel requires lower amounts of processing; in one form (for example, when the market fuel M has an intermediate RON of between about 70 and 85. Such octane concentrations could then be adjusted via OOD or COD through the operation of the fuel system 200 that is discussed in more detail elsewhere in this disclosure.

Moreover, unlike HCCI modes of operation where the fuel and air is fully premixed prior to introduction into the combustion chamber 156, the GCI embodiment of ICE 150 will permit CI operation under higher engine loads and compression ratios without concern over engine knocking. Furthermore, by permitting in-cycle control of the combustion phasing, an ICE 150 configured as a GCI can take advantage of fuel injection timing in order to make it easier to control the combustion process compared to an HCCI configuration where the combination of temperature and pressure inside the cylinder may not be precisely known.

In another form, ICE 150 may be configured as an SI engine that can be operated with a gasoline-based fuel. In this case, the presently-disclosed fuel system may be used to achieve OOD through operation on various fuels, including market gasoline, gasoline without an oxygenate or related anti-knock compound or gasoline with one of the many types of alkyls, aromatics or alcohols. In another form, ICE 150 is configured as a CI engine that can be operated with a diesel-based fuel. In this case, the presently-disclosed fuel system 200 may be used to achieve COD through the use of suitable regenerative solvent-based, affinity-based and size selective-based adsorbents 242A, 244A.

Controller 170 is used to receive data from sensors S and provide logic-based instructions to the various parts of the fuel system 200 that will be discussed in more detail below. As will be appreciated by those skilled in the art, controller 170 may be a singular unit such as shown notionally in FIGS. 1 through 3, or one of a distributed set of units (not shown) throughout the vehicle 100. In one configuration, controller 170 may be configured to have a more discrete set of operational capabilities associated with a smaller number of component functions such as those associated solely with the operation of the fuel system 200. In such a configuration associated with only performing functions related to operation of the fuel system 200, the controller 170 may be configured as an application-specific integrated circuit (ASIC). In another configuration, controller 170 may have a more comprehensive capability such that it acts to control a larger number of components, such as the ICE 150, either in conjunction with or separately from the fuel system 200. In this configuration, the controller 170 may be embodied as one or more electronic control units (ECUs). It will be appreciated that ASICs, ECUs and their variants, regardless of the construction and range of functions performed by the controller 170, are deemed to be within the scope of the present disclosure.

In one form, controller 170 is provided with one or more input/output (I/O) 170A, microprocessor or central processing unit (CPU) 170B, read-only memory (ROM) 170C, random-access memory (RAM) 170D, which are respectively connected by a bus 170E to provide connectivity for a logic circuit for the receipt of signal-based data, as well as the sending of commands or related instructions to one or more of the components within ICE 150, one or more components within fuel system 200, as well as other components within vehicle 100 that are responsive to signal-based instructions. Various algorithms and related control logic may be stored in the ROM 170C or RAM 170D in manners known to those skilled in the art. Such control logic may be embodied in a preprogrammed algorithm or related program code that can be operated on by controller 170 such that its instructions may then be conveyed via I/O 170A to the fuel system 200. In one form of I/O 170A, signals from the various sensors S are exchanged with controller 170. Sensors S may comprise level sensors, pressure sensors, temperature sensors, optical sensors, acoustic sensors, infrared sensors, microwave sensors, timers or other sensors known in the art for receiving one or more parameters associated with the operation of ICE 150, fuel system 200 and related vehicular components. For example, one or more sensors S may be used to determine if a minimum threshold level of an octane-rich fuel component or a cetane-rich fuel component is present in a pair of enriched product tanks 250, 260. Although not shown, controller 170 may be coupled to other operability components for vehicle 100, including those associated with movement and stability control operations, while additional wiring such as that associated with a controller area network (CAN) bus (which may cooperate with or otherwise be formed as part of bus 170E) may also be included in situations where controller 170 is formed from various distributed units.

In situations where the controller 170 is configured to provide control to more than just the fuel system 200 (for example, to the operation of one or more of the ICE 150 or other systems within vehicle 100), other such signals from additional sensors S may also be signally provided to controller 170 for suitable processing by its control logic; one such example may include those signals where combustion data from the ICE 150 is provided for control over the mixing or related delivery of the fuel and air. Likewise, in a manner consistent with various modes of ICE 150 operation, controller 170 may be programmed with drivers for various components within ICE 150, including a fuel injector driver 170F, a spark plug driver (for SI modes of operation) 170G, engine valve control 170H and others (not shown) that can be used to help provide the various forms of fuel introduction to the combustion chamber 156, including those associated with a multiple-late-injection, stratified-mixture, low-temperature combustion (LTC) process as a way to promote smooth operation and low NOx emissions of ICE 150 over a substantial entirety of its load-speed range. Within the present context, load-speed mapping of ICE 150 may be used to identify operating regions such as those used during cold starts and ICE 150 warm-up, low ICE 150 loads, medium ICE 150 loads and high ICE 150 loads, where correspondingly lower amounts of exhaust gas re-breathing takes place through manipulating the overlap of the intake valve 157 relative to the exhaust valve 158, possibly in conjunction with other approaches such as exhaust gas recirculation (EGR) to help provide one or more of combustion control, exhaust gas emission reductions, or other operability tailoring for ICE 150.

In addition to providing instructions for combustion control, emission reductions or the like, the controller 170 interacts with one or more various components that make up conduit 210, including various actuators, valves and related components to control the operation of the delivery of fuel from an onboard fuel supply tank 220 that acts as the main tank for the storage of the market fuel M (for example, conventional or even low-grade gasoline, solvent supply 230 and separation unit 240 (all as shown and described in more detail in conjunction with FIG. 3) in order to effect the production of OOD or COD required to operate ICE 150 for a given set of load and related operating conditions. In one form of CAN, the controller 170 could manage the fuel flow from either the fuel supply tank 220 or the enriched product tanks 250, 260 to the combustion chamber 156 where the two fuels corresponding to OOD or COD are injected separately, or by blending prior to being introduced into the combustion chamber 156 at different ratios depending on load, speed and other optional parameters associated with operation of ICE 150.

Significantly, controller 170 is useful in promoting customizable fuel injection and subsequent combustion strategies for various ICE 150 configurations where a CI mode of operation is used. For example, when used in conjunction with a GCI-based (that is to say, PPCI-based) mode, the controller 170 may instruct the fuel to be injected in a staged manner late in the compression phase of the four-cycle operation of ICE 150. In this way, the fuel charge may be thought of as having both locally stoichiometric and globally stratified properties. Significantly, because an octane-rich fuel (for example, gasoline) has a higher volatility and longer ignition delay relative to a cetane-rich fuel (for example, diesel), by introducing the octane-rich fuel into the combustion chamber 156 relatively late in the compression stroke and taking advantage of the fuel's inherent ignition delay (which helps to promote additional fuel-air mixing), combustion does not commence until after the end of the injection. To achieve a desirable degree of stratification, multiple injections may be used. By operating under the low temperature combustion (LTC) conditions that are associated with stratified fuel combustion, a GCI mode of operation can have significantly reduced NOx production and soot emissions while achieving traditional diesel-like CI mode thermal efficiencies. Moreover, such an approach permits the vehicle 100 to use a version of the onboard market fuel M with a lower octane than would otherwise be used. This is beneficial in that such fuel requires a smaller amount of processing than conventional gasoline and diesel fuels; this in turn reduces the cost as well as entire well-to-tank emissions of other undesirable substances, such as $CO_2$.

In addition to a GCI mode of operation, such instructions as provided by controller 170 are particularly beneficial for the multiple-late injection strategy used for the delivery of fuel in HCCI, RCCI or related modes of operation of ICE 150, as such delivery may be optimized when made to coincide with various sequences in the compression stroke that can be measured by sensors S as they detect crank angle degree (CAD) values from the crankshaft 153 to help control when auto-ignition occurs. Within the present context, the position of the piston 162 within the cylinder 152 is typically described with reference to CAD before or after the top dead center (TDC) position of piston 162. The controller 170 may also base such delivery strategies on other ICE 150 operating parameters such as the previously-mentioned load and engine speed, as well as the number of times such injection is contemplated. For example, CAD from 0° to 180° corresponds to the power stroke, with 0° representing TDC and 180° representing bottom dead center (BDC). Likewise, CAD from 180° to 360° represents an exhaust stroke with the latter representing TDC. Moreover, CAD from 360° to 540° represents an intake stroke with BDC at the latter. Furthermore, CAD from 540° to 720° represents a compression stroke with TDC at the latter. By way of example, the controller 170—when used in a 6-cylinder engine—would have ignition taking place every 120° of crankshaft 153 rotation, that is to say three ignitions per every revolution of ICE 150. Thus, when ignition has taken place each of the six cylinders one time, the crankshaft 153 has rotated twice to traverse 720° of rotary movement. Likewise, if ICE 150 were configured as a 4-cylinder engine, the ignition would take place every 180° of crankshaft 153 rotation.

In one form, one of the sensors S may be a crank sensor to monitor the position or rotational speed of the crankshaft 153. The data acquired from such a crank sensor is routed to the controller 170 for processing in order to determine fuel injection timing and other ICE 150 parameters, including ignition timing for those circumstances (such as cold startup, and the ensuing warm-up) where a spark ignition device is being used. Sensors S such as the crank sensor may be used in combination with other sensors S (such as those associated with valve 157, 158 position) to monitor the relationship between the valves 157, 158 and pistons 162 in ICE 150 configurations with variable valve timing. Such timing is useful in CI modes of operation of ICE 150 in that it can close the exhaust valves 158 earlier in the exhaust stroke while closing the intake (or inlet) valves 157 earlier in the intake stroke; such operation as implemented by controller 170 can be used to adjust the effective compression ratio of ICE 150 in order to obtain the required temperature and pressure associated with CI combustion. Likewise, when SI combustion is required, the controller 170 may instruct the valves 157, 158 to reduce the compression ratio consistent with an SI mode of operation. Furthermore, the controller 170 may—depending on the need of ICE 150—provide auxiliary sparking through SI driver 170G for fuel preparation (such as the generation of free radicals in the air-fuel mixture). Sensed input (such as that from various locations within ICE 150, including CAD from the crankshaft 153, as well as those from driver-based input such as the accelerator of guidance apparatus 140) may be used to provide load indicia Likewise, in addition to suitable adjustment of the valves 157, 158, balanced fuel delivery from each of the enriched product tanks 250, 260 with pressurizing forces provided by one or more fuel pumps 270 may be achieved by controller 170 depending on if ICE 150 is in a CI mode or an SI mode of operation.

In one form, the fuel injection pressures generated by the fuel system 200 may be up to about 500 bar for gasoline direct injection, and up to about 2500 bar for common rail diesel injection where this higher injection pressure is used to expand the operating region of diesel-based CI engines in that it facilitates premixed CI combustion. In so doing, this latter pressure increase for diesel fuel-based engines may offset the needed robustness of construction and reductions in compression ratio and fuel ignition delay. Although there is only pump 270 shown (immediately upstream of the ICE 150) in an attempt to keep visual clarity within the figure, it will be appreciated that additional pumps 270 may be placed in other locations within conduit 210 in order to facilitate the flow of fuel through the fuel system 200, and that all such variants are within the scope of the present disclosure. In addition, the pressure of the fuel being introduced via pump 270 can be varied, and as such may be varied by controller 170 to regulate overall fuel system 200 performance. For instance, higher injected fuel pressures can promote a more thorough octane-enhanced adsorption process.

The controller 170 may be implemented using model predictive control schemes such as the supervisory model predictive control (SMPC) scheme or its variants, or such as multiple-input and multiple-output (MIMO) protocols, where inputs include numerous values associated with the various measurements that may be acquired by sensors S, as well as of estimated values (such as from the lookup tables or calculated algorithmically) based on parameters stored in ROM 130C or RAM 130D or the like. In that way, an output voltage associated with the one or more sensed values from sensors S is received by the controller 170 and then digitized and compared to a predetermined table, map, matrix or algorithmic value so that based on the differences, outputs indicative of a certain operating environment for ICE 150 are generated. These outputs can be used for adjustment in the various components the operation of which falls within the purview of the controller 170, such as the remaining components associated with fuel system 200, as well as for adjusting whether fuel delivered from the fuel system 200 to the combustion chamber 156 corresponds to a bypass condition (as is discussed in more detail elsewhere within the present disclosure) of the ICE 150 or an adsorption condition environment of the ICE 150.

As mentioned above, in one form, controller 170 may be preloaded with various parameters (such as atmospheric pressure, ambient air temperature and flow rate, exhaust gas temperature and flow rate or the like) into a lookup table that can be included in ROM 170C or RAM 170D. In another form, controller 170 may include one or more equation- or formula-based algorithms that permit the processor 170B to generate a suitable logic-based control signal based on inputs from various sensors S, while in yet another form, controller 170 may include both lookup table and algorithm features to promote its monitoring and control functions. Regardless of which of these forms of data and computation interaction are employed, the controller 170—along with the associated sensors S and conduit 210—cooperate such that as an operating load on the ICE 150 varies, a suitable adjustment of the market fuel M that is present in the onboard fuel supply tank 220 may be made to provide the amount of octane or cetane enrichment needed for such operating load by mixing the onboard market fuel M with one or the other of the high-octane or high-cetane product fuels from the enriched product tanks 250, 260.

One operational parameter of ICE 150 that may be preloaded into or generated by controller 170 is the mean effective pressure (MEP). In one form, MEP may be used to correlate ICE 150 operating regimes to fuel needs and the various forms of multiple-late injection strategies discussed previously for various CI mode configurations. MEP—including its variants indicated mean effective pressure (IMEP), brake mean effective pressure (BMEP) or friction mean effective pressure (FMEP)—provides a measure of the ability of a particular ICE 150 to do work without regard to the number of cylinders 152 or displacement of such cylinders 152. Moreover, it provides a measure of the pressure corresponding to the torque produced so that it may be thought of as the average pressure acting on a piston 162 during the different portions of its inlet, compression, ignition and exhaust cycles. In fact, MEP is often considered a better parameter than torque to compare engines for design and output because of its independence from engine speed or size. As such, MEP provides a better indicator than other metrics (such as horsepower) for engines in that the torque produced is a function of MEP and displacement only, while horsepower is a function of torque and rpm. Thus, for a given displacement, a higher maximum MEP means that more torque is being generated, while for a given torque, a higher maximum MEP means that it is being achieved from a smaller ICE 150. Likewise, higher maximum MEP may be correlated to higher stresses and temperatures in the ICE 150 which in turn provides an indication of either ICE 150 life or the degree of additional structural reinforcement. Significantly, extensive dynamometer testing, coupled with suitable analytical predictions, permit MEP to be well-known for modern engine designs. As such, for a CI mode, MEP values of about 7.0 bar to about 9.0 bar are typical at engine speeds that correspond to maximum torque (around 3000 rpm), while for naturally aspirated (that is to say, non-turbocharged) SI modes, MEP values of about 8.5 bar to about 10.5 bar are common, while for turbocharged SI modes, the MEP might be between about 12.5 bar and about 17.0 bar.

Likewise, MEP values may be determined for various load-related operating regimes for ICE 150. Such operating regimes may include low power or load (including, for example, engine idling conditions) that in one form corresponds to a MEP of up to about 1.0 bar, in another form of an MEP of up to about 2.0 bar. Likewise, such operating regimes may include normal (or medium) power or load that in one form corresponds to a MEP of between about 2.0 bar to about 5.0 bar, in another form of an MEP of between about 2.0 bar and about 6.0 bar, in another form of an MEP of between about 2.0 bar and about 7.0 bar. Moreover, such operating regimes may include a high power or load that in one form corresponds to a MEP of about 7.0 bar and above, in another form of an MEP of about 8.0 bar and above, in another form of an MEP of about 9.0 bar and above, and in another form of an MEP of about 10.0 bar and above.

As will be understood, these and other MEP values may be input into a suitably-mapped set of parameters through load-speed mapping or the like that may be stored in a memory accessible location (such as the lookup tables mentioned previously) so that these values may be used to adjust various ICE 150 operating parameters, as well as for the controller 170 when acting in a diagnostic capacity. In such case, it may work in conjunction with some of the sensors S, including those that can be used to measure cylinder 152 volume (such as through crankshaft 153 angle or the like).

Referring again to FIG. 3, in one form, the solvent supply 230 is a part of a closed-loop such that the solvent V can be reused. Within the present context, a closed-loop solvent approach includes those configurations where the solvent V that is used to desorb the adsorbate A can be regenerated and substantially recaptured for reuse rather than relying on a regular addition of solvent V from an external supply. Being closed-loop does not necessitate complete fluid isolation between the solvent V that is routed through solvent conduit 238 and the onboard flow of market fuel M that is routed through conduit 210. In fact, as described elsewhere, fluid interaction between the solvent V traversing conduit 238 and the onboard fuel traversing conduit 210—while each defining different starting and ending locations from one another—takes place at the reaction chambers 242, 244 that act as a common receiving location for the respective fluids. As such, a small amount of the fluid that makes up solvent V may be permitted to escape through the common space defined by the reaction chambers 242, 244 and still be deemed to be within the scope of a closed-loop solvent architecture.

To accomplish this closed-loop retention of the desorbing solvent V, a solvent regeneration unit 236 is formed as part of solvent supply 230 to permit the solvent V to be separated and returned to the tank 232 through solvent conduit 238 in a one-step process. In one form, the solvent regeneration unit 236 may operate by liquid-liquid extraction (also referred to as solvent extraction), where the desorbing solvent V is separated through combination with another immiscible solvent such that a multilayer compound develops based on differences in their solubilities. In another form, the solvent regeneration unit 236 may operate by extractive distillation. Such extractive distillation may be especially useful in situations where the difference in volatility between the solvent V and the desorbate D is small. In this latter form, a relatively non-volatile (that is to say, high boiling point) separation solvent is introduced into the solvent supply 230 in such a way to cause the relative volatilities to change between it and the desorbing solvent V such that each of them may be subsequently separated by conventional distillation activities.

Regardless of how the solvent V is regenerated within the solvent supply 230, the solvent elution-based process as discussed herein allows the solvent V to wash the adsorbate A from the reaction chambers 242, 244. In one form, the solvent V is made to flow past the adsorbate A and adsorbent 242A, 244A that in one form defines a surface of the reaction chambers 242, 244 such that the eluting power of the solvent V forces the displacement of the adsorbate A from the adsorbent 242A, 244A. Thus, the use of solvent V such as ethylene glycol, propylene carbonate or the like is such that when the solvent V is circulated into the separation unit 240 through the solvent supply 230, the high affinity of such solvent V for the adsorbate A portion of the market fuel M that is formed on the adsorbent 242A, 244A, coupled with the low affinity of the solvent V for the material that makes up the adsorbent 242A, 244A, promotes a significant elution force that in turn causes displacement of such adsorbate A from the adsorbent 242A, 244A. In one form, any excess solvent V remaining on the adsorbent 242A, 244A within the reaction chambers 242, 244 may be recovered by methods such as heating the adsorbent 242A, 244A or passing air or steam to evaporate the solvent V followed by condensation.

As a result of the reaction between the adsorbate A and the solvent V that is being introduced from the solvent supply 230 to the separation unit 240, at least a portion of the adsorbed compounds or related agents that are on the exposed one of the reaction chambers 242, 244 are released in the form of desorbate D. After this, the solvent V and liberated desorbate D may be carried away through the conduit 238 that makes up the solvent supply 230 in order to have the solvent V regenerated. This regeneration results in a separation of the solvent V from the desorbate that is now a suitable octane-enriched or cetane-enriched fuel component $E_O$, $E_C$. The controller 170 may then cooperate with conduit 210 to ensure that the octane-enriched or cetane-enriched fuel component $E_O$, $E_C$ is introduced into the combustion chamber 156 if the driving cycle or limited supply of suitably-enriched fuel components within the respective enriched product tanks 250, 260 warrants it, or otherwise routed to a respective one of the enriched product tanks 250, 260 where such fuel component can be stored until needed.

In one form, a batch-like processing approach may be made to take place within the separation unit 240 where the pair of reaction chambers 242, 244 are placed in fluid communication with the solvent supply 230 such that the market fuel M that becomes adsorbed in a respective one of the reaction chambers 242, 244 may be subsequently desorbed by the chemical interaction of the solvent V in the solvent supply 230 as previously discussed. By having at least two reaction chambers 242, 244, the separation unit 240 may be operated in a parallel manner such that while one of the reaction chambers 242, 244 is being used with its respective adsorbent 242A, 244A to preferentially capture the adsorbate A, the other of the reaction chambers 242, 244 may be exposed to the solvent V from the solvent supply 230 in order to perform the desorbing or elution operation, after which the roles of the two chambers 242, 244 are reversed through manipulation by controller 170 of valves (not shown) that make up part of conduit 238, 210. After exposure of the adsorbate A to the solvent V such that both the desorbate D and portions of the solvent V are removed from the separation unit 240, the respective one of the adsorption chambers 242, 244 is regenerated and ready for another batch of incoming market fuel M for processing. This removal of the solvent V and adsorbate A has the tendency of keeping the adsorption chambers 242, 244 at a mild temperature, which is beneficial in that it avoids the need to reheat the first and second reaction chambers 242, 244 during each regeneration stage. Significantly, the use of solvent V means that the need to use heating as a way to desorb the adsorbate A can be avoided, thereby reducing the number and complexity of components used with or as part of the fuel system 200. In a related way, when the eluent (solvent V) and the eluate (adsorbate A) are separated remotely from the reaction chambers 242, 244 (such as when taking place in solvent regenerator 236), the reaction chambers 242, 244 are further kept at a mild temperature, which eliminates the need to re-heat such chambers during each regeneration stage.

Eventually, the adsorbent 242A, 244A reaches a state where it can no longer capture any additional adsorbate A; resulting in a saturated state for the adsorbent 242A, 244A. The controller 170 can be used in conjunction with one or more of the sensors S to determine the amount of adsorbate A production within the fuel system 200, particularly as it relates to the desired degree of saturation. For example, by detecting a concentration difference between the market fuel M stream that is entering into the separation unit 240 and that leaving the separation unit 240, the logic contained within the controller 170 may determine that a certain value of such concentration difference can be correlated to a degree of adsorbate A saturation of the adsorbent 242A, 244A. Regardless of the mechanism used, when saturated adsorbent 242A, 244A is reached, the controller 170 adjusts various valves that are formed within conduit 210 in order to selectively adsorb or desorb the adsorbate A. Within the present context, the adsorbent 242A, 244A is considered to be unsaturated when it is still capable of capturing a measurable quantity of the adsorbate A.

In using the solvent supply 230, the controller 170 may instruct batch-based switching between the two chambers 242, 244 through one of three different techniques. In a first technique, a sensor S is connected to the exit of the first reaction chamber 242 such that when the inlet and outlet liquid streams of the first reaction chamber 242 have an equal aromatic content as detected by sensor S (which in turn provides indicia of saturation in that no additional changes in the aromatic concentration are occurring), the controller 170 in response to such an acquired signal switches the market fuel M that is being delivered from supply tank 220 to the second reaction chamber 244. In a second technique, a timer is connected to the controller 170 to allow it to open and close at certain time intervals (for example every 15 minutes) where the time intervals depend on the adsorbent 242A, 244A size and rate of the adsorption. In a third technique, sensor S may be a temperature sensor such that once the temperature at the respective reaction chamber 242, 244 is no longer increasing (which in turn provides indicia of no further heat release due to adsorption), the controller 170 switches the fuel flow from the first reaction chamber 242 to the second reaction chamber 244. Thus, under such batch-based operation, the two-chamber construction of the separation unit 240 is such that while adsorption of a portion of the market fuel M is taking place in reaction chamber 242, any adsorbent 242A, 244A that was previously saturated in the other reaction chamber 244 is regenerated by exposure of the adsorbate A to the solvent V. As mentioned previously, with a different choice in adsorbent 242A, 244A in the reaction chambers 242, 244, a cetane-rich adsorbate $A_C$ (rather than an octane-rich adsorbate $A_O$, both of which are shown generally as residing within the volumetric space defined by the first and second reaction chambers 242, 244) can be formed in a comparable manner. For example, in one form, materials such as Carbopack B (manufactured by Supelco Inc. of Bellefonte, Penn.) and graphitizied carbon black may be used to provide a cetane-attracting functional-group adsorbent.

In one form, the first of the reaction chambers 242 is sized and shaped to fluidly receive an aromatic (that is to say, octane-rich) compound contained within the market fuel M such that contact of the aromatic on the surface of reaction chamber 242 results in the creation of the octane-rich adsorbate $A_O$ for OOD. It will be appreciated that related functionality fuel components such as oxygenates or double bond-based alkyls may also fall within the category of compounds or fuel components that can provide OOD. In such form, the preferential action of a suitable functional group contained within or formed on the surface of the adsorbent 242A that makes up the reaction chamber 242 provides the necessary separation. In this form, the operation of the tank 232, solvent regeneration unit 236 and conduit 238 causes the adsorbate A to be desorbed and released to an octane-rich one of the enriched product tanks 250, 260 for subsequent use in the combustion chamber 156 in situations where the market fuel M is a higher boiling point (for example, between about 165° C. and about 350° C.) diesel-type fuel. With a different choice in adsorbent 242A, 244A (for example, a size selective version) from the solvent supply 230 being circulated through the reaction chambers 242, 244, a cetane-rich adsorbate $A_C$ for combustion chamber 156 is created; such an approach may be used in situations where the market fuel M is a lower boiling point (for example, between about ambient temperature and about 200° C.) gasoline-type fuel. As such, the reaction chambers 242, 244 may—in addition to having batch processing capability discussed previously through selective adsorbing and desorbing activities—be set up in stages (not shown) in the manner previously discussed such that a first stage preferentially provides one or the other of affinity-based or size selective-based adsorption while a second stage provides the other of the size selective—based or affinity-based adsorption. Such staging may take place sequentially, in either common or separate housing, in a manner suitable to ensure relatively small volumetric packaging needed to fit as unobtrusively as possible within vehicle 100. It will be appreciated that the order of separation achieved by such staging may be affinity-based first and size selective second, or size selective first and affinity-based second, depending on the need.

In one form, the fuel system 200 is particularly configured to operate on a market fuel M that can provide energy for a CI mode of operation. Thus, unlike in situations where the boiling range of the separated fuel stream is within a range that is compatible with heat exchange values that can be provided by the operation of the ICE 150 (such as the case when the market fuel M includes significant gasoline fractions), when the separated stream has low volatility (that is to say, high boiling point) such as the case when separating diesel fuel fractions, then the high temperature needed to perform such regeneration is either not readily available onboard vehicle 100 or is such that the separated component could be prone to cracking at the high temperatures required to perform such regeneration of solvent V. In this way, the solvent V and the cetane-rich adsorbate $A_C$ may then be separated by a one-step method in the solvent regeneration unit 236 such as discussed elsewhere in this disclosure. Such separation may be enhanced by selecting the solvent V to have much different volatility than the cetane-rich adsorbate $A_C$. It will be appreciated that the fuel system 200—working in conjunction with controller 170—may be configured to operate in either of both of an OOD mode of operation or a COD mode of operation depending on one or more of the affinity and size of the adsorbent 242A, 244A such as those discussed previously.

In one form, the solvent supply 230 may be disposed within the housing or related containment structure that makes up the separation unit 240, while in another, it may be placed outside such housing such that as solvent V is needed to perform the desorbing operation from one or both of the reaction chambers 242, 244, it can be delivered from the solvent supply 230 through suitable conduit 238 as previously discussed. As with the packaging used to reduce space for the solvent supply 230, the adsorbent 242A, 244A type may be selected to promote small housing or containment structure size. In one form, if the adsorbent 242A, 244A employs a high surface area-to-volume ratio by exploiting the geometry and structure of particles and bed that make up the two reaction chambers 242, 244, such higher surface area may lead to higher adsorption capacity and smaller separation unit 240 size as a way to promote ease of system integration.

As mentioned previously, various forms of stratified combustion may lead to the types of LTC that are beneficial to low-$NO_X$ operation of ICE 150. With regard to the use of OOD or COD for a CI mode of operation, the fuel may be formed as a hybrid of a main fuel (for example, gasoline or other low-cetane variant) and an igniter fuel (for example, diesel or other high-cetane variant), where the location, frequency and timing of introduction of each varies by concept or configuration such as those discussed previously. For example, in one concept, a single high-octane fuel is introduced via direct injection during a compression stroke. In such case, the injection of the fuel may take place at a time relatively retarded from conventional diesel injection timing to ensure adequate mixing. Since the overall combustion process is dominated by reactivity-controlled LTC, the resulting NOx and soot exhaust emissions tend to be very low. In another case, a single igniter fuel is introduced via direct injection during the compression stroke in order to promote cold-start and high-load operation where the overall combustion process is dominated by diffusion-controlled mixing of the fuel at or near the piston 162 TDC movement. In still another case, a dual injection regime introduces the main fuel via port fuel injection early in the compression stroke within the combustion chamber 156 such that it is fully mixed with a fresh air charge during the intake stroke, after which the igniter fuel is introduced via direct injection as a way to control ignitability such that the overall combustion process is dominated by the spatially well-mixed high-octane fuel after the ignition of high-cetane fuel. As with the first case mentioned previously, such operation produces low NOx and soot emissions, due at least in part to an overall lean mixture. In yet another case, the main fuel is introduced via direct injection during the compression stroke, while the igniter fuel is introduced via direct injection near TDC to enable the ignition control; in this way, it provides a relatively robust mixture via improved thermal or spatial stratification. This in turn leads to low hydrocarbon, NOx and soot formation, at least for relatively low engine loads.

In one form, a so-called bypass may be used for intermittent circumstances associated with various ICE 150 operating environments (such as cold starts, or where one or both of the two enriched product tanks 250, 260 may be empty) such that at least a fraction of the market fuel M from the supply tank 220 is provided directly to the combustion chamber 156 without entering the separation unit 240. This bypass operation may be established by controller 170 to help promote a continuous supply of fuel to ICE 150, where such continuity is particularly useful under these intermittent operational conditions. In particular, the controller 170 may be used to manipulate various fuel delivery parameters, such as coolant temperature, exhaust gas temperature, EGR, exhaust gas re-breathing, level of separated fuels, delivery timing or the like for such transient conditions. This helps promote wider operating ranges based on reactivity differences between the high-octane and high-cetane fuel components. This wider operating range is especially beneficial with regard to reducing NOx or soot emissions regardless of factors such as ICE 150 load, operating temperature, fuel delivery or the like. This in turn reduces the likelihood of having to make emissions or performance tradeoffs (such as a soot/NOx tradeoff), where factors such as temperature and engine equivalence ratio can otherwise force the controller 170 to determine which of two or more competing ICE 150 operating conditions should be permitted to operate. Such operating range is also beneficial in that it permits various other fuel injection strategies to be utilized to enable optimum efficiency, reduced emissions and improved combustion robustness compared to conventional SI-based or CI-based cycles, including using EGR, reduced compression ratios or the like as part of a larger LTC strategy.

As previously discussed, in one form the adsorbents 242A, 244A used for the reaction chambers 242, 244 are configured as one or more functional groups presenting on the surface of the sorbent material such that they comprise affinity-based sorbents. In another form, the adsorbents 242A, 244A may separate adsorbates A by their molecular shape such that they comprise size selective sorbents. For example, to target high-cetane fuel components, the design would focus on separating linear or slightly branched alkanes from aromatics, cyclic and highly branched alkanes. Stated another way, the sorbents can act in two mechanisms, where in a first, the adsorbent 242A, 244A is selected to have functional groups that attract specific molecules such as aromatics, cyclic, (and oxygenates if present). The linear and slightly branched molecules (which may include cetane) are not adsorbed and pass through the pores of one or both of the reaction chamber 242, 244, depending on their mode of operation. The second mechanism is based on the difference in the molecules sizes such that linear molecules (such as n-alkanes) may pass through the relatively porous material while other molecules which have a larger dynamic diameter (such as highly-branched alkanes) are hindered from passing through most pores and accumulate in the adsorption-based reaction chamber 242, 244. In this latter mechanism, a packed bed of size selective sorbent may be used for COD generation, as linear alkanes with high CN will go into smaller pores while the other components with larger molecular size will not, causing these other components to come out first as a raffinate. Moreover, in configurations where the adsorbent 242A, 244A acts as a molecular sieve, it may be made up of more than one particle type or size in order to preferentially promote the adsorption of a desired species based on the size of such species. Regardless of the adsorbent 242A, 244A choice, the performance is optimized on various factors, including the capacity and selectivity of the adsorbent 242A, 244A, the concentration ratio of the market fuel M (which provides indicia of the aromatics fractions), and how fast the solvent V regeneration and desorption-based removal proceeds.

Specific surface area (that is to say, the total surface area of a given substance per unit mass, for example, in $m^2/g$) is a valuable metric in assessing the efficacy of an adsorbent such as adsorbent 242A, 244A. In particular, increasing the specific surface area of the adsorbent 242A, 244A permits a higher adsorption capacity. For example, when using activated carbon with specific surface area ranging in size from 500 to 1500 $m^2/g$, the adsorption capacity correspondingly increases, as well as with the adsorbed molecule type. Thus, adsorbents 242A, 244A with different specific surface areas can be used to selectively adsorb one or the other of a desirable component within the market fuel M, and all such variants are deemed to be within the scope of the present disclosure. For example, the specific surface area may be tailored to adsorb low boiling point straight alkanes as a way to produce the cetane-rich adsorbate $A_C$ that can act as a high ignition quality booster for the market fuel M in a CI mode of operation. Likewise, the specific surface area may be tailored to adsorb aromatics as a way to produce the octane-rich adsorbate $A_O$ that can act as a high ignition quality booster for the market fuel M in an SI mode of operation. For instance, to adsorb certain aromatics, the adsorbent 242A, 244A that makes up the reaction chambers 242, 244 can be mesoporous (2-50 nm diameter) activated carbon, which in turn can lead to an average recovery of about 80%. An example of the anticipated adsorption capacity of some aromatic components for activated carbon is listed in Table 1.

TABLE 1

| Component | mg/g-adsorbent |
| --- | --- |
| Toluene | 15 |
| Naphthalene | 45 |
| 1-methylnaphthalene | 37 |

Other natural adsorbents (for example, coconut shell) may also be used for separating the desired components. In another form, the surface of the reaction chambers 242, 244 may define one or more beds that may be made up of more than one adsorbent 242A, 244A in order to preferentially promote the adsorption of a desired species. Regardless of the adsorbent 242A, 244A bed choice, the performance is optimized on various factors, including the adsorbent 242A, 244A capacity and selectivity, the concentration ratio of the market fuel M (which provides indicia of the aromatics fractions), and how fast the regeneration and desorption-based removal proceeds.

With particular regard to the bypass mentioned previously, in certain operating environments of ICE 150, it may be necessary for reliable combustion to not use the separation unit 240, but to instead use conventional modes of operation such as those associated with traditional diesel-based CI or gasoline-based SI, as at startup or other scenarios there are no exhaust gases or hot radiator fluid available to heat the adsorption cycle, or where there are no high-cetane or high-octane fuels present in the enriched product tanks 250, 260. Within the present context, this operating environment that corresponds to having neither an adequate amount of heat (such as the residual that accompanies the ICE 150 combustion process, as well as any supplemental source of heat such as that associated with an electric heater, separate combustor or the like) nor onboard supply of cetane-rich or octane-rich fuel components is referred to as the bypass condition. In the bypass condition, the controller 170 may direct the supply of fuel to be conveyed from the market fuel supply tank 220 and directly to the combustion chamber 156 of ICE 150 so that a suitable CI or SI mode of operation may be undertaken without having to rely upon the production or use of the additional octane-rich or cetane-rich fuel components as produced by the separation unit 240 and solvent supply 230. Contrarily, an operating environment that corresponds to having one or both an adequate amount of heat (such as the residual that accompanies the ICE 150 combustion process) and onboard supply of cetane-rich or octane-rich fuel components is referred to as the adsorption condition; in this latter condition, varying amounts of additional octane-rich or cetane-rich fuel components may be produced, used in the combustion process, or both. The bypass condition of ICE 150 means that the bypass may be used to avoid otherwise undesirable latency periods associated with sudden driving operations in response to speed or load demands, as well as those related to temperature or related weather conditions. In such circumstances, the controller 170 may instruct some or all of the market fuel M from supply tank 220 to be supplied directly to the combustion chamber 156, without entering the separation unit 240. The fraction of bypass can be controlled and manipulated via different methods such as temperature of the coolant or exhaust gas, level of separated fuels, time or other variables. Likewise, the controller 170 may in one form optionally mandate that under this bypass condition, the SI mode of operation be employed, while in another optional form may permit the CI mode of operation to proceed, such as those associated with the market fuel supply tanks 220 containing diesel fuel.

Two examples are presented to highlight when the bypass operation that may take place when the operating environment of the ICE 150 is warranted. In a first example, during startup of ICE 150 when insufficient heat is available to properly operate an adsorption operation within the separation unit 240, the controller 170 works together so that fuel flow to the combustion chamber 156 may partially come from the two enriched product tanks 250, 260, while the main fuel portion comes from the market fuel supply tank 220. In a second example, if either of the two enriched product tanks 250, 260 is empty at any time (such as that associated with unexpected driving cycle conditions, lack of solvent-based elution of the adsorbate A needed for desorption or other event that would leave the enriched product tanks 250, 260 empty or nearly empty), the controller 170 may likewise instruct one or more fuel pumps 270 (only one of which is shown) to pressurize the market fuel M being delivered from the supply tank 220 directly to the combustion chamber 156 as a way to at least partially bypass the separation unit 240 to compensate for the shortage in the enriched product tank 250 or the enriched product tank 260 where it will be understood that one or the other of the enriched product tanks 250, 260 is configured to contain an octane-rich fuel component while the other is configured to contain a cetane-rich fuel component, depending on whether the adsorbent 242A, 244A that is being introduced into the reaction chambers 242, 244 is an affinity-based one or a size selective-based one. Thus, in one form, the enriched product tank 250 contains a high RON fuel while the enriched product tank 260 contains a high CN fuel, whereas in another form, the enriched product tank 250 contains a high CN fuel while the enriched product tank 260 contains a high RON fuel. In situations where both cold engine conditions and low enriched product tank 250, 260 levels are present, the bypass may be complete rather than partial, and may accompany an SI or conventional diesel-based CI mode of operation as well.

Having described the subject matter of the present disclosure in detail and by reference to specific embodiments thereof, it is noted that the various details disclosed in the present disclosure should not be taken to imply that these details relate to elements that are essential components of the various described embodiments, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified as preferred or particularly advantageous, it is contemplated that the present disclosure is not necessarily limited to these aspects.

It is noted that one or more of the following claims utilize the term "wherein" as a transitional phrase. For the purposes of defining features discussed in the present disclosure, it is noted that this term is introduced in the claims as an open-ended transitional phrase that is used to introduce a recitation of a series of characteristics of the structure and should be interpreted in like manner as the more commonly used open-ended preamble term "comprising."

It is noted that terms like "preferably", "generally" and "typically" are not utilized in the present disclosure to limit the scope of the claims or to imply that certain features are critical, essential, or even important to the disclosed structures or functions. Rather, these terms are merely intended to highlight alternative or additional features that may or may not be utilized in a particular embodiment of the disclosed subject matter. Likewise, it is noted that the terms "substantially" and "approximately" and their variants are utilized to represent the inherent degree of uncertainty that may be attributed to any quantitative comparison, value, measurement or other representation. As such, use of these terms represent the degree by which a quantitative representation may vary from a stated reference without resulting in a change in the basic function of the subject matter at issue.

It will be apparent to those skilled in the art that various modifications and variations can be made to the described embodiments without departing from the spirit and scope of the claimed subject matter. Thus it is intended that the specification cover the modifications and variations of the various described embodiments provided such modifications and variations come within the scope of the appended claims and their equivalents.

What is claimed is:

1. A vehicular propulsion system comprising:
    an internal combustion engine comprising at least one combustion chamber; and
    a fuel system comprising:
        a fuel supply tank for containing an onboard fuel;
        a separation unit in fluid communication with the fuel supply tank, the separation unit comprising at least one adsorbent-based reaction chamber that is configured to receive and separate at least a portion of the onboard fuel into an adsorbate and a remainder;
        a solvent supply in fluid communication with the separation unit and containing at least one solvent therein to convert at least a portion of the adsorbate into a desorbate; and
        a solvent regeneration unit configured to separate at least a portion of the at least one solvent from the desorbate such that during operation of the internal combustion engine and the fuel system, at least one of the-onboard fuel, separated desorbate and remainder is conveyed to the combustion chamber.

2. The vehicular propulsion system of claim 1, further comprising:
    a plurality of sensors that are configured to acquire operational parameters associated with the internal combustion engine; and
    a controller responsive to signals conveyed from the plurality of sensors in order to:
        make a determination of an operational condition of the internal combustion engine; and
        instruct the fuel system to convey at least one of the-onboard fuel, separated desorbate and remainder to the combustion chamber depending on the operational condition.

3. The vehicular propulsion system of claim 2, wherein the operational condition of the internal combustion engine comprises at least a first operational condition and a second operational condition such that:
    upon the determination that the internal combustion engine is in its first operational condition, at least a portion of the onboard fuel is conveyed to the combustion chamber without first passing through the separation unit; and
    upon the determination that the internal combustion engine is in its second operational condition, at least a portion of the onboard fuel is conveyed to the combustion chamber after having passed through the separation unit.

4. The vehicular propulsion system of claim 2, wherein the operational condition of the internal combustion engine is such that the controller instructs the fuel system to convey a plurality of the at least one onboard fuel, separated desorbate and remainder to the combustion chamber.

5. The vehicular propulsion system of claim 4, wherein the at least one of the onboard fuel, separated desorbate and remainder comprise an octane-rich component and a cetane-rich component such that upon a load that corresponds to the operational condition of the internal combustion engine, the controller instructs the fuel system to convey one or the other of the octane-rich component and the cetane-rich component to the combustion chamber.

6. The vehicular propulsion system of claim 1, wherein the at least one adsorbent-based reaction chamber contains an affinity-based adsorbent.

7. The vehicular propulsion system of claim 1, wherein the at least one adsorbent-based reaction chamber contains a size selective-based adsorbent.

8. The vehicular propulsion system of claim 1, wherein the at least one adsorbent-based reaction chamber contains both an affinity-based adsorbent and a size selective-based adsorbent.

9. A vehicular fuel system for converting an onboard fuel into an octane-rich component and a cetane-rich component, the fuel system comprising:
- a fuel supply tank for containing an onboard fuel;
- a separation unit in fluid communication with the fuel supply tank, the separation unit comprising at least one adsorbent-based reaction chamber that is configured to receive and separate at least a portion of the onboard fuel into an adsorbate and a remainder;
- a solvent supply in fluid communication with the separation unit and containing at least one solvent therein to convert at least a portion of the adsorbate into a desorbate; and
- a solvent regeneration unit configured to separate at least a portion of the at least one solvent from the desorbate such that during operation of the internal combustion engine and the fuel system, at least one of the-onboard fuel, separated desorbate and remainder is conveyed to the combustion chamber.

10. A method of producing fuel for an internal combustion engine, the method comprising:
- conveying onboard fuel to a separation unit that makes up a portion of a fuel system;
- contacting the fuel with an adsorbent situated within the separation unit such that at least a portion of the fuel is converted into an adsorbate and at least a portion of the fuel is converted into a remainder;
- reacting at least one solvent with the adsorbate such that at least a portion of the adsorbate is converted into a desorbate;
- separating the desorbate from the at least one solvent; and
- conveying at least one of the onboard fuel, separated desorbate and remainder to a combustion chamber within the internal combustion engine.

11. The method of claim 10, further comprising:
- sensing at least one operational parameter associated with the fuel system and the internal combustion engine; and
- using a controller to determine an engine operational condition that is selected from a plurality of operational conditions based on the at least one sensed operational parameter such that the conveying at least one of the onboard fuel, separated desorbate and remainder to a combustion chamber within the internal combustion engine is performed based on the determined operational condition.

12. The method of claim 11, wherein the engine operational condition comprises:
- a first operational condition such that at least a portion of the onboard fuel is conveyed to the combustion chamber without first passing through the separation unit; and
- a second operational condition such that at least a portion of the onboard fuel is conveyed to the combustion chamber after having passed through the separation unit.

13. The method of claim 11, wherein the operational condition corresponds to at least one of a predetermined temperature, load and rotational speed of the internal combustion engine.

14. The method of claim 11, further comprising using a controller to determine that the engine operational condition corresponds to a situation where at least one of a first enriched product tank and a second enriched product tank that are used to contain a respective separated desorbate and remainder is substantially empty.

* * * * *